Figure 4:
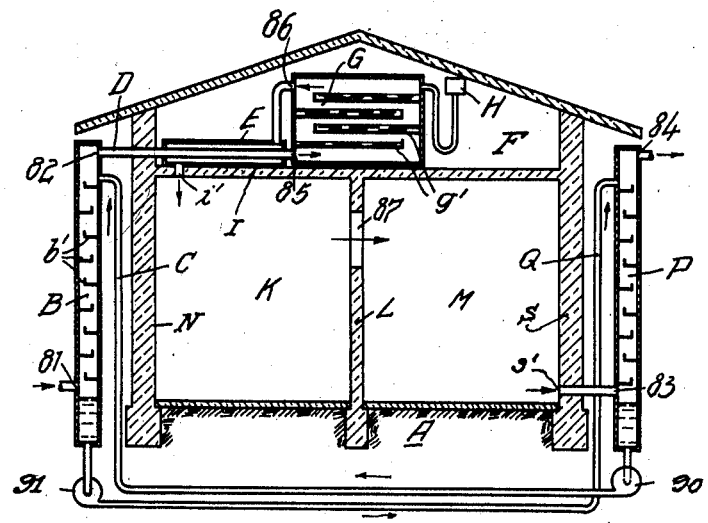

July 18, 1933.  E. ALTENKIRCH  1,918,682
PROCESS FOR CONDITIONING AIR OR THE LIKE
Filed Feb. 17, 1931  3 Sheets-Sheet 1
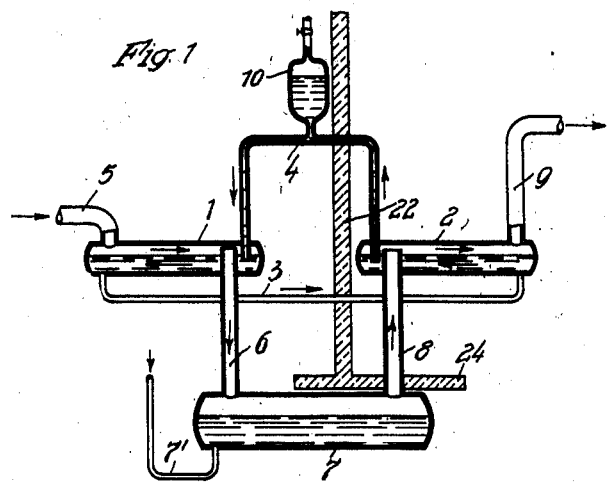
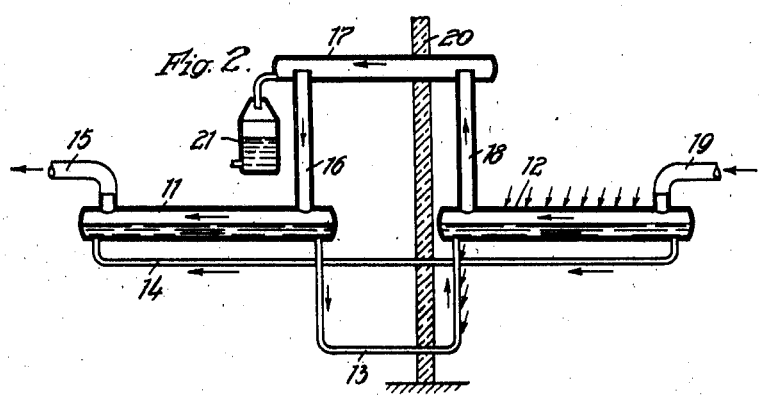

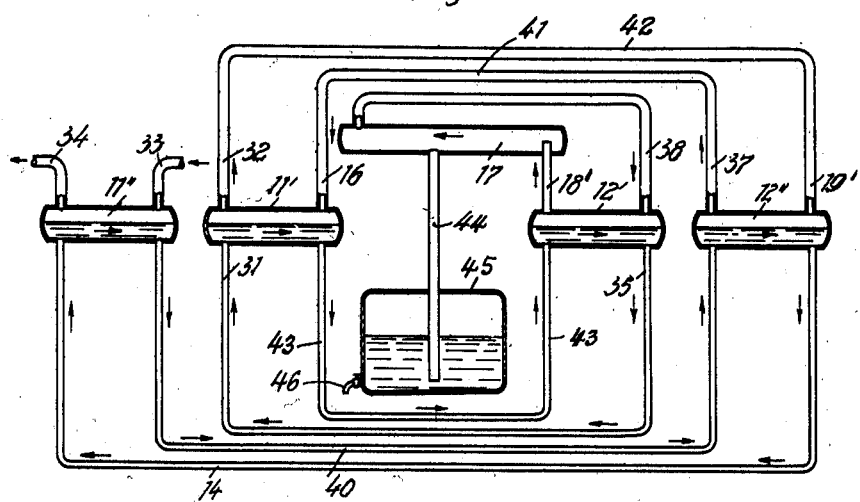

July 18, 1933.   E. ALTENKIRCH   1,918,682
PROCESS FOR CONDITIONING AIR OR THE LIKE
Filed Feb. 17, 1931    3 Sheets-Sheet 3

Inventor
Edmund Altenkirch
by Knight Bros.
Attorneys

Patented July 18, 1933

1,918,682

UNITED STATES PATENT OFFICE

EDMUND ALTENKIRCH, OF NEUENHAGEN NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

PROCESS FOR CONDITIONING AIR OR THE LIKE   REISSUED

Application filed February 17, 1931, Serial No. 516,318, and in Germany September 5, 1929.

The subject matter of the invention refers to a novel thermodynamic process for varying the moisture content of atmospheric air by means of water vapor absorbing substances. This process solves the problem of varying at will the degree of moisture of atmospheric air by means of given temperature differences—even such of small value as exist for instance in nature, as between places in the sun and in the shade. By these novel means the air may be dried or moistened to any desired extent as the case may be. The drying is accompanied by generation of heat and the moistening is accompanied by cooling, and drying results in the collecting of water. The novel and characteristic features of the process consist in causing the air to assume within the apparatus much higher or lower degrees of moisture (as the case may be) than the air possesses at the entrance or the outlet of the apparatus. This may be attained in the simplest manner by passing air through an apparatus in which it is conducted successively either through an absorption vessel, an evaporating vessel, and an expelling vessel, or through an expeller, a condenser and an absorption vessel. In either case an exchange of water vapor takes place between an absorbing substance of a certain degree of concentration, and a second absorbing substance of another degree of concentration, the exchange being brought about by the passing air stream. Thereby the discharge of water vapor from one of the substances occurs in a temperature range different from the range in which the absorption of water vapor by the other substance occurs. The change in concentration of the absorbent material which occurs in the lower temperature range is thereby reversed in the higher temperature range. Likewise, the change in concentration of the absorbent material which occurs in the higher temperature range is thereby reversed in the lower temperature range. It is of advantage to use in such processes the counter current principle between the air and the absorption solution in case the air and the solution suffer large changes in their water vapor partial pressure, respectively their concentration during their passage through the apparatus.

In the accompanying drawings I have illustrated in more or less diagrammatic fashion the manner in which the process according to my invention may be reduced to practice.

Figure 5:
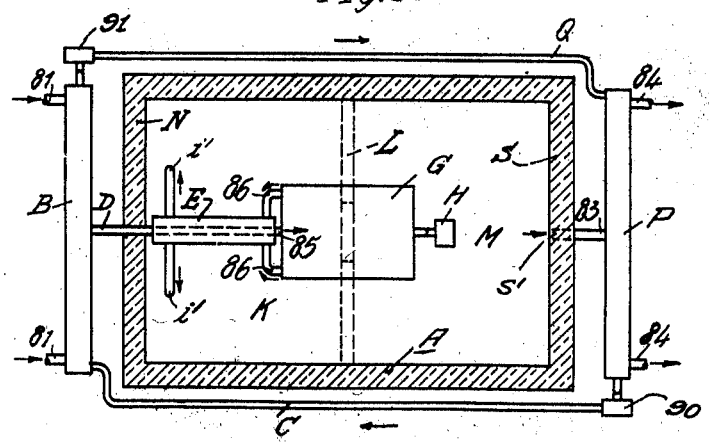

In these drawings:

Fig. 1 represents an apparatus illustrating the principle according to which heat or cold are produced by means of relatively dry atmospheric air. The same apparatus and principle may also serve for cooling of water, Fig. 2 represents an apparatus which serves for obtaining water from comparatively dry atmospheric air by means of the sun's heat, Fig. 3 represents an arrangement in which the principle of obtaining water shown in Fig. 2 is applied in a somewhat modified form, Fig. 4 represents a vertical section through a building which is equipped with an arrangement on the principle of Fig. 1 for cooling its rooms, and Fig. 5 represents a horizontal section through the building wall just below the roof in Fig. 4, the refrigerating devices appearing in plan view.

I shall first describe the use of relatively dry air for producing heat with reference to the apparatus shown in Fig. 1. Two vessels 1 and 2 are shown there, formed and arranged such that they are capable of bringing an absorption solution and atmospheric air into contact with one another in counter current over an appreciable path length. As absorption solution may be used for instance any suitable alkaline liquor, which at the beginning of the process may be saturated with water in accordance with the prevailing temperature and the low partial pressure of the water vapor in the surrounding relatively dry air. By using first any suitable means known in the art, and not shown in Fig. 1, the absorption solution may be started to flow from vessel 1 through connecting pipe 3 into the vessel 2, and through the connecting pipe 4 back to the vessel 1. The relatively dry atmospheric air enters at 5 and is moved at the beginning through any conventional circulating means not shown in Fig. 1 over the solution in vessel 1, at the end of which it enters a vertically downwardly leading tube 6, through which it is conveyed into vessel 7 which contains pure water. After it has traversed this vessel it rises in the vertical tube 8 and enters the absorption vessel 2 which it traverses in the direction of the arrow, leaving this vessel through the discharge tube 9 through which it reenters the atmosphere.

The atmospheric air enters at 5 can at first not absorb any moisture from the solution in vessel 1 because, as was already mentioned, this solution is just saturated at the prevailing partial pressure of the water vapor and the prevailing outside temperature. As soon as this dry air has passed through tube 6 and has come in contact with pure water in vessel 7, it will absorb water vapor in its passage through this vessel. The heat necessary for this evaporation is assumed to be supplied to this vessel 7 in sufficient amounts, so that the temperature in vessel 7 will not be appreciably lowered. The air then passes through tube 8 into the absorption vessel 2. Here it will give up part of its vapor content to the absorption solution, because the partial pressure of the water vapor in the air is now higher than the saturation pressure of the absorption solution. When the air is thus relieved of its excess water vapor it is discharged through tube 9 into the atmosphere. During the absorption of water vapor by the solution in vessel 2, heat is generated which will result in an increase of solution temperature. This warm solution, rich in water passes through tube 4 into the absorption vessel 1 for the following reasons. Warm solution is also contained in the lower portion of the ascending branch of tube 4 which dips into vessel 2. It has therefore the tendency to rise in that branch. When the solution reaches the horizontal portion of tube 4 it is gradually cooled and therefore becomes denser. Thus the solution enters the descending branch of tube 4 with a specific weight greater than its weight in the ascending branch and therefore has the tendency to descend in the descending branch. This circulation based upon the difference in specific weights, once started, continues so long as a sufficient difference in temperature between the solutions in vessels 1 and 2 prevails. As a consequence of this circulation the liquid in vessel 1 tends to assume a level higher than the level prevailing in vessel 2. As a result of this difference liquid will flow from vessel 1 through pipe 3 to vessel 2 as indicated by the arrow, and thus a liquid circulation between the two vessels is maintained automatically, once the system is set into operation. In this manner a store of rich solution is always maintained in vessel 1. Any vapor and gas bubbles which might tend to collect at the highest point of tube 4 rise into the de-airing vessel 10, whence they can be removed from time to time.

The relatively dry atmospheric air entering at 5 is able to now absorb from this rich solution water vapor. By means of conventional radiating fins or other suitable heat exchange devices, well known in the art and not shown in this figure, care is taken that the heat consumed by the abstraction of water from the solution through the air, is supplied in sufficient quantities from the outside without appreciably lowering the temperature in vessel 1.

The air which has thus been enriched with water in vessel 1 will still absorb more water on its passage through vessel 7, because this vessel as stated before contains pure water. The air thus heavily enriched with moisture can now give up more moisture on its passage through vessel 2 even at comparatively high temperatures. Therefore, this entire process may be used for producing useful heat which may be abstracted from vessel 2 by any conventional means. The air is discharged from vessel 2 through tube 9 into the atmosphere at a degree of moisture content higher than that of the air entering vessel 1 at 5, because the absorption solution in vessel 2 has at the higher temperature also a higher saturation pressure. The warm and moist air automatically rises in the vertical tube 9, and thereby produces a natural draught which now maintains an automatic circulation of air through the apparatus in the direction of the arrows shown, without the continued use of artificial ventilating means which, as was stated before, are necessary to start the apparatus.

The water in vessel 7 which is consumed during the operation may be replenished thru tube 7'. By means of the heat insulating walls 22, 24, vessels 1 and 7, which must be supplied with heat from their surroundings, are insulated from vessel 22 in which useful heat is produced.

The arrangement may be made also in such manner that useful cold is produced instead of useful heat. For this second purpose it is only necessary to dissipate the heat produced in absorption vessel 2 sufficiently fast, so that the temperature in vessel 2 cannot rise appreciably above that of its surrounding atmosphere. In this case the absorption solution in vessel 2 will be so heavily saturated with water that after it has entered vessel 1 it will be capable to give up water vapor to the entering relatively dry air also at temperatures lower than the temperature surrounding vessel 1. The cold thus produced in vessel 1 may be used for cooling purposes. Also the lower temperature which the evaporation in vessel 7 tends to produce may be maintained at a desired level and employed for useful purposes.

The atmospheric air which is discharged from vessel 2 through tube 9 is considerably richer in water than the air entering at 5, though it has already discharged some of its moisture to the solution in vessel 2. Accordingly, it enters vessel 2 at a degree of moisture content which is higher than that of the air discharged through pipe 9. This temporary increase in moisture content above the final content at which the air is discharged, is the means by which according to the present invention the largest possible number of calories are obtained from a given quantity of water at a desired moderate cooling or heating temperature. It must be considered that in such an arrangement and process not only a certain amount of pure water evaporates in vessel 7, but that in vessel 1 also the amount of water is evaporated which the solution has absorbed in vessel 2, so that under favorable circumstances a multiple of the amount of water evaporated in vessel 7 is brought into use to produce the desired caloric effects.

After the air taken in at 5 has traversed the apparatus it is still quite far removed from the limit of water vapor saturation, because—as aforementioned—after it has been saturated with water vapor in vessel 7 it has given up considerable amounts of this vapor again to the solution in vessel 2. If it should now be desired to run such an apparatus with the smallest possible amount of air, it is only necessary to lead the air discharged at 9 through a second similarly constructed apparatus in which it goes through the same process of variation in moisture content, so that again cold or heat are produced, as the case may be, at the same prevailing temperatures. If desired, this process may be repeated several times more with the same amount of air.

In Fig. 2 an arrangement is shown in which the degree of moisture of relatively dry air may be lowered through the existence of a given difference in temperature, and by which at the same time the water derived from the air may be collected. In this figure the two absorption vessels are denoted with 11 and 12. The relatively dry air, to be further deprived of moisture, enters vessel 12 at 19, and is discharged from vessel 11 at 15. It traverses in succession vessel 12, tube 18, a condenser 17, the downwardly leading tube 16, absorption tube 11, at the end of which discharge tube 15 is provided. The two absorption vessels are connected by means of the liquid conducting tubes 13 and 14. The heat necessary for carrying out this process is assumed to be supplied by the rays of the sun. For this purpose a heat insulating wall 20 is provided which protects the portions of the apparatus on the left side of the wall from the sun's rays, whereas the apparatus portions to the right of it, in particular the absorption vessel 12 and the upwardly leading portion of pipe 13 are exposed to the sun's rays which are indicated by the inclined arrows. The condensate which is produced in condenser 17 is collected in vessel 21.

This arrangement operates as follows:

At the beginning the absorption solution in vessels 11 and 12 has a saturation pressure consistent with the partial pressure of the water vapor in the surrounding atmosphere. Due to the temperature increase in vessel 12 by exposure to the sun's rays, the saturation pressure in this vessel rises. The relatively dry air entering at 19 will, therefore, absorb moisture from the solution in vessel 12 at this higher temperature. The heat required for this process is supplied by the sun's rays. The air which tends to rise due to its higher temperature rises in pipe 18, traverses condenser 17, where it is cooled in the shaded portions of the latter and descends through pipe 16 into the absorption vessel 11. Here the cooler air yields to the cooler absorption solution more moisture than it had taken up from the warmer solution in vessel 12. The heat produced by this absorption is dissipated to the cool surroundings in the shade by suitable means, such as radiating ribs or fins, not shown in Fig. 2, so that the temperature of vessel 11 does not rise appreciably beyond the temperature prevailing in the shade. By this absorption of moisture from the air, the solution in vessel 11 has become richer in water and the richest at the end at which it comes first in contact with the moist air entering through pipe 16. This richest portion of the absorption solution is discharged from vessel 11 through pipe 13 into absorption vessel 12 at the end of the latter, at which the air passing through vessel 12 leaves the vessel through pipe 18. The air near the end of its passage through vessel 12 coming in contact with the extremely rich absorption solution entering the vessel through pipe 13, will still further enrich its moisture content and will thus enter vessel 11 through tube 16 at a still higher degree of moisture content than the air which had passed through vessel 11 at the beginning of the process. The water content of the absorption solution in vessel 11 is, therefore, still further increased and will in turn cause an increase of water vapor discharge to the air in vessel 12. Owing to the higher temperature prevailing in vessel 12 the absorption solution at the end of this vessel at which it comes first in contact with the relatively dry air entering at 19 will be again deprived of a very large portion of its absorption vapor. Thus when this empoverished solution is conveyed from that end of vessel 12 through pipe 14 into the left hand end of vessel 11, it will owing to its empoverished condition, and owing to the prevailing low temperature, deprive the air about to be discharged from vessel 11 through pipe 15 of its moisture to such an extent, that the air is discharged through pipe 15 with a moisture content lower than that of the air entering at 19. The amount of water thus abstracted from the air by the apparatus is accumulated in that portion of the absorption solution which is located in the vessel portions which are connected with the condenser 17, i. e. in vessel 11 the solution is extremely rich at the right hand end, and in vessel 12 at the left hand end. The air passing through the condenser 17 thus will more and more increase its moisture content until a saturation point has been reached, at which the temperature in the shade is sufficient to condense the moisture contained in the air. The water of condensation collects in vessel 21, and from that point on the operation remains steady and continuous, i. e. an amount of water is condensed in vessel 17 equal to the difference in moisture content between the air entering at 19 and leaving at 15. The drier air leaving at 15 can now be used for cooling or drying purposes. Besides, the water collected in vessel 21 from the air may be of value in an arid country.

Since the air in ascending pipe 18 is warmer than the air in the descending pipe 16 an automatic draught is produced which continues drawing air through the apparatus during its normal operation. Likewise, the difference in temperature between the absorption solution in the cooler descending branch of pipe 13 and the warmer ascending branch of this pipe automatically brings about circulation of the absorption solution between vessels 11 and 12.

Notwithstanding the fact that the atmospheric air discharged at 15 has a smaller moisture content than the air entering at 19, the air is first enriched in moisture during its passage through the apparatus beyond its original moisture content. This enriching which brings the air condition beyond the stable limits defined by the moisture contents at the beginning and at the end of the process is also here the means by which according to the invention the precipitation of water is rendered possible in the most economical way.

The arrangement shown and described with reference to Fig. 2 may be operated also in somewhat different manner. In principle, the same as just described, the portion of the apparatus located at the right hand side of wall 20 is heated, and that on the left hand side is cooled. By the application of heat the effect is attained that the air entering at 19 leaves the apparatus at 15 in drier condition, the net amount of moisture abstracted from it being collected in vessel 21. Since the atmospheric air enters the absorption vessel 11 through pipe 16 with a moisture content which is greater than its content when entering at pipe 19, and since on the other hand it leaves the appratus at 15 with a moisture content smaller than that of the entering air, there must exist in vessel 11 at one point along the path of the air a condition of the latter in which the moisture content is exactly equal to that of the air entering at 19. Therefore, vessel 11 could be divided into two parts, one part at one end of which the air to be treated enters, and at the other end of which it leaves, deprived of moisture, such as at point 15. In the other part of the divided vessel 11 the moisture content of the air remains always above that of the air under treatment, and thus an arrangement can be made in which the air under treatment passes only through one comparatively short vessel, while in the remaining vessels a fixed amount of air constantly circulates in a closed circuit. This arrangement is shown in Fig. 3.

In principle the operation is the same as in the arrangement shown in Fig. 2. The absorption vessel 11 of Fig. 2, however, is divided in Fig. 3 into two vessels, 11' and 11", which are both traversed by the absorption solutions in the directions of the arrows. Similarly absorption vessel 12 of Fig. 2 is divided in Fig. 3 into two vessels 12' and 12". Vessel 11' is connected with 12' by means of liquid pipes 31 and 43, and vessel 11" is connected with 12" by the liquid pipes 14 and 40, so that there are established two independent liquid circuits. Vessels 12' and 12" are exposed to heat, the same as the right side of the apparatus in Fig. 2, while the other vessels are all located in a cooler place, such as in the shade as shown in Fig. 2. The atmospheric air to be deprived of moisture enters vessel 11" through pipe 33, and leaves this vessel through pipe 34. During the passage of air through this vessel the solution contained in the latter absorbs water vapor from the air so that the latter is discharged at 34 drier. The absorption solution in vessel 11" thus enriched with water passes into vessel 12" in the direction of the arrows and discharges, owing to the prevailing higher temperature, the same amount of water vapor into the air passing through that vessel as was absorbed from the air passing through vessel 11". The air passing through vessel 12" travels in a closed circuit between absorption vessels 12" and 11' in the following manner:

The air from vessel 12" passes by way of the vertical pipe 37 into the horizontal pipe 41 (due to its higher temperature) and thence through the descending pipe 16' into the absorption vessel 11'. It passes through this vessel and out at the other end by way of the vertical pipe 32, horizontal pipe 42, vertically descending pipe 19 back into vessel 12". In the absorption vessel 11' the air enriched with water vapor in vessel 12'' discharges its vapor into the absorption solution which thereby becomes enriched, so that when this solution passes through pipe 43 into vessel 12', it will discharge in that vessel into the air circulating through the latter the same amount of water vapor which it had absorbed in vessel 11'. This air heavy laden with moisture passes through the vertically rising pipe 18 into the condensing vessel 17 where, owing to the low temperature to which this vessel is exposed, moisture is condensed. The amount of moisture which is thus condensed from the air is always resupplied to the air when it passes again through vessel 12' from the moisture content of the solution in that vessel. The condensate flows from condenser 17 through pipe 44 into the collecting vessel 45, from which it can be drawn through the cock 46.

The air which leaves absorption vessel 12'' through pipe 37 is not so moist that at the prevailing surrounding temperature the water could be precipitated from it by condensation. In order to withdraw the water vapor from that air the latter is conducted in vessel 11' in counter current over the cooler absorption solution in that vessel to which it yields its moisture.

An arrangement according to which the principle described hereinabove can be utilized for cooling the rooms of a building is shown in Figs. 4 and 5. The particular mode of arranging the apparatus follows in this modification the underlying principle involved in the arrangement shown in and described with reference to Fig. 1, except that in Fig. 1 useful heat is the object while in Figs. 4 and 5 cooler and drier air is the object. On the shadyside of the building, Fig. 4 for instance, outside of its north wall N a vertical absorption tank B is provided, which extends in substance across the entire wall as shown in Fig. 5, and which is of rectangular transverse section. Into this vessel, which contains absorption solution in its lower portion, is supplied outside air of prevailing moisture content through inlet pipes 81 terminating a short distance above the level of the liquid. This air rises in vessel B and thereby comes in contact in counter current with lean absorption solution supplied from the top through pipe C and trickling down over trays b'. The air which has thus been deprived of most of its moisture and has become warmer through the heat of absorption produced in vessel B, is discharged from the vessel at 82 and passes by way of pipe D at 85 into a large vessel G mounted in the attic F of the building. On its way to tank G pipe D passes through a wider pipe E. Vessel G is provided with flat trays g' arranged in the tank as shown, and is supplied with water from a storage tank H, so that the water entering the vessel from the top will trickle over trays g' towards the bottom. The air entering vessel G at 85 travels through the vessel in zig-zag fashion, thereby passing over the water in the trays g', thereby being again slightly moistened by the water vapor produced by the evaporation of pure water. Principally, however, the air is very strongly cooled by the water evaporation. It leaves vessel G at 86 and enters the wide pipe E, whereby it enters into heat exchange with the air passing through pipe D, precooling the air in the latter pipe, and passes through an opening i' through the ceiling I into room K. Therefore, the temperature of room K is considerably lowered through air which is cooler and drier than the outside air. The air passes from room K through an opening 87 in partition L into room M in which it sinks to the bottom where it is discharged through a pipe s' at the bottom of the south wall S of the building. Through this pipe it enters vapor expulsion vessel P at 83. This vessel extends across the side of the building similar to vessel B, but preferably on the south side S so that it is effectively exposed to the rays of the sun. The air current entering vessel P through inlet 83 is heated, and in rising takes up water vapor expelled by the heat from the rich absorption solution which is supplied through pipe Q to the top of vessel P and in which it trickles down over small trays similar to trays b' of vessel B. The moisture laden air is discharged from vessel P into the open through pipe 84 near the top of the vessel. The arrows in Fig. 4 indicate the course of the air just described.

The absorption solution collects in lean condition in the lower portion of vessel P from which it is drawn off by means of a pump 90 and delivered by the aforementioned supply pipe C to the top of vessel B. A second pump 91 draws the water laden solution from the bottom of vessel B and delivers it through the aforementioned pipe Q to the top of vessel P. Thus is established a steady liquid circuit by way of B, 91, Q, P, 90 and C. In the vessel P the air becomes moister, and in the vessel B the air becomes drier and slightly warmer. The strong cooling of the air current occurs in the vessel G, owing to the vigorous evaporation of pure water occurring in trays g'. Thereby the air is again slightly enriched with moisture, but not to an extent of the moisture content of the air entering the apparatus at 81. Its temperature is slightly raised, above that which it assumed in vessel G, by the heat exchanger E, so that when the air enters room K its relative moisture content and its temperature are lower than those of the atmospheric air. The drying process of the air which occurs within the range of lower temperature is reversed within the range of higher temperature by the return to it of a large amount of moisture from the absorption solution in vessel P before the air is discharged into the open. Thus also an automatic regeneration of the absorption solution, enriched in vessel B in a low temperature range, occurs in vessel P as a reverse process in a high temperature range.

The draught produced in vessel P through gradually warming air in the vessel is usually sufficient for producing an effective and uniform air current through vessels B and G, through rooms K, M and through vessel P. If it should be desired to increase the speed of the air current any well known means such as ventilators may be installed at suitable points. They are omitted in Fig. 4, being not necessary elements concerned with the operation of the apparatus according to the invention.

All modifications shown and described and by which the principle involved in the invention may be reduced to practice have in common the novel idea according to which through atmospheric air exchange of water vapor is brought about within a certain partial pressure zone, but between two ranges of different temperature and different concentration of the absorption solution, whereby the change in condition of the absorption medium occurring at lower temperature is reversed at higher temperature, and whereby the change in condition of the absorption medium occurring at higher temperature is reversed at lower temperature. The amounts of water either gained or to be expended must be respectively drawn off or supplied from the outside.

I claim:

1. A thermodynamic process for varying the moisture of atmospheric air by means of water vapor absorbing materials, consisting in exchanging, by means of an air stream, water vapor between a body of absorption material of a given degree of concentration and a similar body of a different degree of concentration, and in the evaporation of the vapor from one body within a temperature range different from the temperature range at which the other body absorbs the vapor, whereby the change in vapor concentration of one body within the lower temperature range is reversed in the higher temperature range, and the change in vapor concentration of the other body within the higher temperature range is reversed in the lower temperature range.

2. A thermodynamic process for varying the absolute moisture content of atmospheric air, consisting in conducting the air successively through two vessels containing a water vapor absorbing solution and forming a circulation system for said solution, and being exposed to different temperature ranges, whereby the supplied air yields within one temperature range in one of said vessels to the solution therein a given amount of water vapor, and takes up within the other temperature range in the other vessel from the solution therein a sufficient amount of water vapor, to vary the moisture content of the air within one of said temperature ranges in excess of the normal state appertaining to that range, and to reverse said variation within the other temperature range, whereby the net excess amount of moisture thus either abstracted from or supplied to the air constitutes a quantity equal to the difference in the absolute moisture content between the air supplied to and discharged from the system.

3. A thermodynamic process for producing cold or heat consisting in bringing atmospheric air within a given temperature range in contact with one portion of a vapor absorbing solution, then bringing the air in contact with pure water and then bringing the air, within a temperature range, higher than the first mentioned range, in contact with another portion of said absorbing solution and in circulating the solution between said two portions, whereby either in one of said portions useful heat, or in the other portion useful cold can be produced.

4. In a continuous thermodynamically operating system including a water evaporating vessel and two vessels operating in two different temperature ranges and containing water vapor absorbing solution and forming a solution circulating system, the thermodynamic process for moistening atmospheric air, consisting in passing the air first over the absorption solution in the vessel of lower temperature range to moisten it by the water content of said solution, then passing the air through said water evaporating vessel to further moisten it, and lastly passing the air over the absorption solution in the vessel of higher temperature range for regenerating the absorption solution by absorption of moisture from the air before the latter returns to the atmosphere.

5. In a continuous thermodynamically operating system, including a water evaporating vessel and two vessels operating in two different temperature ranges and containing water vapor absorbing solution and forming a solution circulating system, the thermodynamic process for varying the absolute moisture content of atmospheric air, consisting in passing the air first over absorption solution in the vessel of lower temperature range to deprive the air of moisture, then cooling the air by passing it through said water evaporation vessel, and lastly passing the air over absorption solution in the vessel of higher temperature range, for regenerating the absorption solution by expelling part of its water content into the air before the latter returns to the atmosphere.

6. In a thermodynamically operating air conditioning system for rooms, including a pure water evaporating vessel, a vapor absorbing solution circuit containing an absorption vessel located within a given temperature range and an expulsion vessel located within a temperature range higher than the first mentioned range, the thermodynamic process for drying and cooling atmospheric air, consisting in passing the moist atmospheric air through said absorption vessel to dry it, then passing it through said evaporating vessel to cool it, then passing it through the rooms to be cooled and lastly passing it through said expulsion vessel wherein the water in the enriched solution is expelled into the air before the latter returns to the atmosphere for regenerating the absorption solution.

7. In a thermodynamically operating air conditioning system for rooms, including a pure water evaporating vessel, a vapor absorbing solution circuit containing an absorption vessel located within a given temperature range and an expulsion vessel located within a temperature range higher than the first mentioned range, the thermodynamic process for drying and cooling atmospheric air, consisting in passing the moist atmospheric air through said absorption vessel to dry it, then passing the air slightly warmed by the drying through said evaporating vessel to extensively cool it, then bringing this cooled air into heat exchange with the warm air entering the evaporating vessel to slightly re-heat the cold air, then passing it through the rooms to be cooled and lastly passing it through said expulsion vessel wherein the water is expelled from the solution into the air before the latter returns to the atmosphere for regenerating the absorption solution.

8. In a thermodynamically operating system for absorbing and separating moisture from relatively dry atmospheric air, including a condenser, an absorption vessel and an expulsion vessel, both of said vessels being connected into a liquid circuit and containing water vapor absorption solution, the expulsion vessel being located within a range of a given temperature sufficient to expel vapor from the solution, the condenser and the absorption vessel being located within a lower temperature range for condensing pure vapor in the condenser and for absorbing vapor into the solution in the absorption vessel, the thermodynamic process of conducting the moist atmospheric air first through the expeller to excessively moisten it within the higher temperature range, then conducting it through the condenser and through the absorber within the lower temperature range, and discharging it from the absorber, whereby the air is deprived of a part of its moisture in the condenser and of a part of it in said absorber, the moisture abstracted in the condenser constituting the difference in moisture content between the atmospheric air supplied to the expeller and that discharged from the absorber.

EDMUND ALTENKIRCH.